UNITED STATES PATENT OFFICE.

THEODOR DIEHL, OF MANNHEIM, BADEN, GERMANY, ASSIGNOR TO GEORG CARL ZIMMER, OF SAME PLACE.

COLORING-MATTER FROM THE SULPHO-ACIDS OF ETHYL OR DIPHENYLAMINE COMBINED WITH TETRAZODIPHENYL OR TETRAZODITOLYL.

SPECIFICATION forming part of Letters Patent No. 380,098, dated March 27, 1888.

Application filed November 29, 1887. Serial No. 256,422. (No specimens.)

*To all whom it may concern:*

Be it known that I, Doctor THEODOR DIEHL, a subject of the Emperor of Germany, resident at Mannheim, Germany, (assignor to the firm of GEORG CARL ZIMMER, of Mannheim,) have invented new and useful Improvements in Coloring-Matters, of which the following is a specification.

I have discovered that the sulpho-acids obtained from monoethylanilin or diphenylamine can, by the processes hereinafter described, be combined with tetrazodiphenyl or tetrazoditolyl to produce new coloring-matters that dye cotton in the soap bath, and which are partly remarkable for their fiery tints and their comparatively permanent nature.

The following may serve as examples of the production of coloring-matters according to this invention:

A.

1. *Coloring-matter from benzidin + two molecules of monoethylanilinsulpho-acid.*—28.2 kilos of benzidin sulphate, or the equivalent quantity of any other benzidin salt, are diazotized in a solution of six hundred liters water with fourteen kilos nitrite by the addition of forty kilos of hydrochloric acid. The tetrazo compound formed is poured under continual stirring into a solution of forty-six kilos monoethylanilin-sulphonate of soda in six hundred liters of water, to which is added so much acetate of soda that all mineral acid is bound. After about twelve hours stirring the reaction will be complete, the separated color-acid is converted into its soda salt, and this is salted out. The coloring-matter, which dissolves with difficulty, dyes cotton a sulphur yellow.

2. *Benzidin + two molecules of diphenylamine-sulpho-acid.*—The monoethylanilinsulpho-acid of the previous example is replaced by fifty-four kilos diphenylamine-monosulphonate of soda, producing a coloring-matter that dyes cotton reddish yellow.

3. *Benzidin + diphenylaminesulpho-acid + ethylanilinsulpho-acid.*—28.2 kilos benzidin-sulphate are diazotized as described, the solution of the tetrazo compound is poured under stirring into twenty-seven kilos diphenylamine-sulphonate of soda, and thirty-five kilos acetate of soda dissolved in six hundred liters of water. The blackish-brown intermediate product formed is introduced into a solution of twenty-three kilos monoethylanilin-sulphonate of soda and six kilos carbonate of soda in about nine hundred liters water. After stirring for twelve hours, the color solution is boiled and filtered, and the coloring-matter is then salted out. It dissolves with some difficulty, the same as Nos. 1 and 2, and dyes cotton a reddish yellow.

B.

1. *Benzidin + diphenylaminesulpho-acid + phenol.*—28.2 kilos benzidin are diazotized, as in the previous examples, and combined with twenty-seven kilos diphenylamine-sulphonate of soda. The formed intermediate compound is added to an alkaline solution of 9.5 kilos phenol in about six hundred liters water. The solution is stirred again for about twelve hours, is then boiled and filtered, and the coloring-matter is salted out. This produces a yellow tint on cotton.

2. *Benzidin + diphenylaminesulpho-acid + cresol.*—If in the foregoing example the phenol is replaced by eleven kilos cresol, a coloring-matter is produced that dyes somewhat more red than the preceding one.

3. *Benzidin + diphenylaminesulpho-acid and resorcin.*—If in place of the phenol in example 1 eleven kilos resorcin are used under otherwise the same conditions, a coloring-matter is produced that dyes cotton in the soap bath with an orange-red color.

4. *Benzidin + diphenylaminesulpho-acid + salicylic acid.*—By combining the above-described intermediate product with sixteen kilos salicylic acid an orange-yellow product will be obtained.

5. *Benzidin + ethylanilinsulpho-acid + naphthionic acid.*—The tetrazo compound produced from 28.2 kilos benzidin sulphate can be combined with twenty-three kilos monoethylanilin-sulphonate of soda under the same conditions as described in example No. 1. The orange-colored intermediate product then acts upon twenty-six kilos naphthionate with formation of a red coloring-matter that is considerably yellower than the dye known as "Congo red."

6. *Benzidin + diphenylaminesulpho-acid +*

*naphthionic acid.*—The intermediate product from benzidin and diphenylaminesulpho-acid, already described, combines in an analogous manner with twenty-six kilos naphthionate to form a red coloring-matter, which in suit stands between that above mentioned and Congo red.

7. *Tolidin+diphenylaminesulpho-acid + naphthionic acid.*—In the preparation of tetrazoditolyl I proceed as in the preparation of tetrazodiphenyl, only with the difference that 31.2 kilos tolidin sulphate are used. The intermediate product produced with twenty-seven kilos diphenylaminesulpho-acid reacts upon twenty-six kilos naphthionate with formation of a bluish-red coloring-matter.

8. *Benzidin + diphenylaminesulpho - acid + betanaphtholsulpho-acid.*—If the above-described intermediate product is combined with twenty-six kilos betanaphtholmonosulphonate of soda (Schaffer) in alkaline solution, a violet-red coloring-matter is produced.

9. *Tolidin+diphenylaminesulpho acid+alphanaphtholalphasulpho-acid.*—If the intermediate product obtained from tolidin + diphenylaminesulpho-acid is made to react upon alpha-naphtholalphamonosulpho - acid, a red - violet coloring-matter is produced.

10. *Benzidin + diphenylaminesulpho - acid + betanaphtholdisulpho - acid.*—If, instead of the betanaphtholmonosulpho - acids in examples 8 and 9, the equivalent quantities of a disulpho-acid are used, reddish-violet coloring-matters are formed.

Having thus described my invention and the manner of employing the same, what I claim as my invention, and wish to have secured to me by Letters Patent of the United States of America, is—

1. The production of coloring-matters that dye unmordanted cotton directly by the action of one molecule of tetrazo salt upon two molecules of the sulpho-acids of monoethylanilin or diphenylamine.

2. The production of coloring-matters that dye unmordanted cotton directly by the action of one molecule of the sulpho-acids referred to in the preceding claim, and the subsequent combination with phenols, salicylic acids, phenol-sulpho-acids, the sulpho-acids of alpha and beta naphthol or of alpha and beta naphthylamine.

In testimony whereof I have signed my name to this specification in the presence of two subscribing witnesses.

THEODOR DIEHL.

Witnesses:
J. F. MONAGHAN,
H. E. HAMMOND.